United States Patent [19]

Kim et al.

[11] Patent Number: 5,418,299

[45] Date of Patent: May 23, 1995

[54] BLEND OF FLEXIBLE COIL POLYMER AND THEMOTROPIC LIQUID CRYSTALLINE OLIGOMER

[75] Inventors: Ki-Soo Kim, Katonah, N.Y.; Sophia Dashevsky, Fair Lawn, N.J.; Jian-Lin Liu, Yorktown Heights; Stanley W. Palmaka, Yonkers, both of N.Y.

[73] Assignee: Akzo Nobel N.V., Arnhem, Netherlands

[21] Appl. No.: 156,668

[22] Filed: Nov. 23, 1993

Related U.S. Application Data

[63] Continuation of Ser. No. 891,502, May 29, 1992, abandoned.

[51] Int. Cl.$^6$ .................. C08L 67/02; C08L 69/00; C08L 71/02; C08L 77/00
[52] U.S. Cl. .................... 525/400; 525/408; 525/425; 525/444; 525/466
[58] Field of Search ............ 525/444, 425, 466, 408, 525/400

[56] References Cited

U.S. PATENT DOCUMENTS

| | | | |
|---|---|---|---|
| 4,386,174 | 5/1983 | Cogswell | 524/27 |
| 4,439,578 | 3/1984 | Kim | 524/538 |
| 4,565,850 | 1/1986 | Prevorsek et al. | 525/425 |
| 4,728,698 | 3/1988 | Isayev et al. | 525/439 |
| 4,837,284 | 6/1989 | Matzner et al. | 525/437 |
| 4,952,334 | 8/1990 | Hakomi et al. | 252/299.01 |

OTHER PUBLICATIONS

Ober, C. et al. "Liquid Crystal Polymers..." Polymer Journal vol. 14 No. 1 pp. 9–17 (1982).
V. Percec et al., "Oligomers", Encyclopedia of Polymer Science and Engineering, vol. 10, pp. 455–456 and 462–463 (1987).
D. Dutta et al., "Polymer Blends Containing Liquid Crystals: A Review", Polymer Engineering and Science 30:17, 1005–1018 (1990).

*Primary Examiner*—Patricia A. Short
*Attorney, Agent, or Firm*—Richard P. Fennelly; Louis A. Morris

[57] ABSTRACT

Blends can be formed which comprise a flexible coil polymer substrate, e.g., of a poly(alkylene terephthalate), and a thermotropic, essentially liquid crystalline oligomer which comprises aromatic units and at least one linear polyalkylene spacer. These blends can be used to form fibers or molded articles.

3 Claims, No Drawings

BLEND OF FLEXIBLE COIL POLYMER AND THEMOTROPIC LIQUID CRYSTALLINE OLIGOMER

This is a continuation of application Ser. No. 07/891,502, filed May 29, 1992, now abandoned.

BACKGROUND OF THE INVENTION

It is known to blend flexible coil polymer substrates with liquid crystal polymers. A recent review article relating to this area of technology is by D. Dutta et al., "Polymer Blends Containing Liquid Crystals: A Review", Polymer Engineering and Science, Mid-September 1990, Vol. 30, No. 17, pp. 1005-1018. An example of a recent patent relating to polymer blends which contain polymers having liquid crystalline properties is U.S. Pat. No. 4,728,698 to A. Isayev. A more recent example of work in this area is U.S. Ser. No. 726,600, filed Jul. 8, 1991 which describes the use, as an additive to a flexible coil polymer substrate, of thermotropic liquid crystal segmented block copolymers containing mesogenic and flexible coil polymer blocks. In all of these cases, the liquid crystal additive is a polymer having a sufficient number of repeat units to produce a polymer, as contrasted from a low molecular weight oligomer, (e.g., a molecular weight over about 6,000).

U.S. Pat. No. 4,565,850 to D. C. Prevorsek et al. teaches the use of certain nematic oligomers as additives to such thermoplastic polymers as the polyesters, polyamides, polycarbonates, polyethers, and poly(acetals). The type of oligomer taught for use by Prevorsek et al. is one which contains "R" groups in its main chain which are wholly selected from cyclic groups, such as cyclohexylene, phenylene, naphthalene, biphenylene, and anthracene. These oligomers are taught as having a Tg which is at least 10° C., preferably 25° C. higher, than the substrate polymer. The mixture of substrate polymer and oligomer appears to result in a two phase system in which the oligomer is dispersed throughout the substrate.

SUMMARY OF THE INVENTION

The present invention relates to admixture of a flexible coil polymer, as substrate, and a liquid crystalline oligomer which results in a single phase system. The oligomer is a thermotropic, essentially liquid crystalline oligomer comprising aromatic units and at least one linear polyalkylene spacer therein. The terminology "oligomer", as used herein, is intended to cover those relatively low molecular weight liquid crystalline materials which have a sufficient number of repeat units to confer the appropriate degree of mesogenicity to such material without being of a molecular weight range as conventionally occurring in liquid crystalline "polymers".

DETAILED DESCRIPTION OF THE INVENTION

One component of the blends of the present invention is a flexible coil polymer as a substrate or matrix to which the liquid crystal oligomer is added. Included within this definition are the known polyester and polyamide polymers such as poly(ethylene terephthalate), poly(butylene terephthalate), nylon-6,6, nylon 6, amorphous nylons, and polyester thermoplastic elastomers based on PBT and polytetramethylene oxide units. Other flexible coil polymers which are contemplated for use in regard to the present invention include the polycarbonates, the polyethers and the poly(acetals).

The liquid crystal oligomer used in the blends of the present invention is one which, unlike the segmented block copolymer systems of U.S. Ser. No. 726,600, is essentially mesogenic in character. It does not contain segments which are similar to the much higher molecular weight, flexible coil polymer blocks of Ser. No. 726,600. The instant oligomers are also of generally lower molecular weight than conventional liquid crystalline polymer additives, having a weight average molecular weight of only up to about 6,000, namely from about 1,000 to about 6,000, preferably from about 1,500 to about 4,000.

The present oligomers differ from the oligomers of U.S. Pat. No. 4,565,850 since they include linear polyalkylene spacers as "R" groups rather than the wholly cyclic structures (i.e., cycloalkyl, aromatic, etc.) required by that patent. The term "polyalkylene" as used herein is intended to embrace both conventional polyalkylene units, —(CH$_2$)$_n$—, as well as units comprising these structures which also have oxygen atom interruption. The Tg of the instant oligomers falls well below that articulated for the oligomers in that patent thereby allowing for thermal mixing of the instant oligomer additive with the substrate at lower temperature.

The type of mesogenic unit for the rod portion of the LC oligomer can be appropriately selected from known mesogenic units in main chain thermotropic liquid crystal polymers, with the proviso that the molecular weight be controlled to yield an oligomer rather than a polymer. Included are those of the general structure:

as set forth in U.S. Pat. No. 4,952,334, for example, which is incorporated herein by reference. In the above formula, for example, in preferred embodiments, X (the "polyalkylene" spacer) can be (CH$_2$)$_n$ and (CH$_2$CH$_2$O)$_n$, where n is an integer of from 2 to 10, m can range from about 2 to about 10, and Y and Z can each be —C(O)O— or —C(O)NH— or can be a single bond between two carbon atoms, and A can be p-phenylene, 1,4-, 2,6-, or 1,5-naphthylene, monosubstituted phenylene with methyl, chloro, or phenyl substitution; —ArCH=CHAr—, where Ar is a phenyl ring, —Ar—C(O)OAr—, —Ar—C(O)NHAr—, or —ArOC(O)—Ar—C(O)O—Ar—, as more fully depicted in the aforementioned patent. In addition, another mesogenic unit which can be employed has the structure —Ar—C(O)—NH—Ar—NH—C(O)—Ar—. Yet another mesogenic unit can have the formula —ArC(O)OAr'OC(O)Ar— where Ar' can be unsubstituted or substituted (e.g., alkyl or alkoxy) phenyl (derived from hydroquinone) or biphenyl (derived from biphenol) and Ar can be derived from terephthalic or the mesogenic-producing naphthylenic starting materials. The commercial rod polymers based on oxybenzoate units, 4,4'-biphenylene terephthalate units, and oxynaphthalene carboxylate units (the latter two including copolymers with the oxybenzoate units) can be especially preferred.

A particularly preferred oligomer has the repeat unit

where n can range from 2 to 10, preferably 4, and Ar are para-phenylene.

In the blends of the present invention it is contemplated that the oligomer can be added at up to about 40%, by weight of the substrate, most preferably from about 0.5% to about 20%.

The oligomers of the present invention can be synthesized, for example, by reacting the appropriate building blocks for the desired mesogen (e.g., a terephthaloyl halide and an α-ω-bis(p-hydroxybenzyloxy)alkane) with a slight molar excess of one building block over the other using single digit molar amounts of each, e.g., 4/3 to 7/6. The use of substantially equal molar amounts of reagent will yield excessively large molecular weight materials (i.e. polymers) as will the use of high molar amounts of reagents.

EXAMPLES 1–4

A series of triad-type mesogenic liquid crystalline oligomers containing a $C_4$ alkylene spacer was synthesized in varying degrees of polymerization ("n") and their physical properties were determined:

To an argon filled three-necked flask was added terephthaloyl chloride (0.03 mole, 6.09 g) and 1,4-bis(p-hydroxybenzoyloxy)butane (0.024 mole, 7.93 g) (mole ratio=5/4) in 25 ml of 1-chloronaphthalene. The temperature was slowly raised to 220° C. with stirring and was maintained for twenty-four hours. After it was allowed to cool to 100° C., methanol (20 ml) was added to the reaction mixture to end-cap the reaction product. A white powder was then collected by filtration. This product was boiled in 500 ml of acetone twice and was then collected by filtration. It was an oligomer and was vacuum dried at 100° C. for ten hours. The yield of product was 95%.

The mole ratio of terephthaloyl chloride to 1,4-bis(p-hydroxybenzoyloxy)butane was 7/6, 6/5, and 4/3 when n=6, 5, and 3 respectively as depicted in the following Table:

| n | Triad/Diad[1] theo. | Triad/Diad[1] found | I.V.[2] (dl/g) | Tg[3] (°C.) | Tm[3], °C. dsc | Tm[3], °C. pom | Tc[3], °C. dsc | Ti[3], °C. pom |
|---|---|---|---|---|---|---|---|---|
| 3 | 2/2 | 2.3/2 | 0.21 | 33 | 259 | 265 | 219 | >350 |
| 4 | 3/2 | 3.2/2 | 0.24 | 35 | 264 | 271 | 223 | >350 |
| 5 | 4/2 | 4.1/2 | 0.28 | 36 | 272 | 280 | 229 | >350 |
| 6 | 5/2 | 4.2/2 | 0.29 | 36 | 271 | 281 | 230 | >350 |

[1] the ratio of "triad" units, —O(O)CArOC(O)ArC(O)OArC(O)O—, to "diad" units, —OC(O)ArOC(O)ArC(O)O—, was determined by proton NMR.
[2] inherent viscosity as determined in tetrachloroethane/p-chlorophenol (4/6 w/w) at 0.5 g/dl at 25° C.
[3] glass transition temperature (Tg), melt temperature (Tm), and recrystallization temperature (Tc) were determined by differential scanning calorimetry (DSC) using a heating/cooling rate of 20°/minute.
[4] isotropization temperature (Ti) was determined by polarizing optical microscopy (POM).

EXAMPLE 5

To a three neck flask was added terephthaloyl chloride (121.9 g), 1,4-bis(p-hydroxybenzoyloxy)butane (165.2 g), and 600 ml of 1-chloronaphthalene. The mixture was heated at 215°–220° C., with stirring, in a nitrogen atmosphere for twenty-four hours. After it was allowed to cool to 100° C., methanol (500 ml) was added. The resulting liquid crystalline oligomer (LCO) product was then collected as in Example 1. The product had a melt temperature of 252° C., a glass transition temperature of 36° C. (by DSC) and an inherent viscosity of 0.22 dl/g.

EXAMPLE 6

This sets forth the thermal behavior of polyethylene terephthalate (PET), of the oligomer ("LCO") from Example 5 and blends of PET and the LCO at 95/5 and 90/10 weight ratios. The DSC data was generated at a rate of 20° C./minute.

| Sample | Tm(°C.) | Tc(°C.) | Tg(°C.) |
|---|---|---|---|
| PET | 246 | 164 | 81 |
| LCO | 252 | 216 | 36 |
| PET/LCO (95/5) | 249 | 171 | 81 |
| PET/LCO (90/10) | 251 | 184 | 78 |

EXAMPLES 7–11

These Examples show the melt flow rate of various (PET)-containing compositions, which would be useful as tire yarn, generated on a KAYNESS GALAXY melt indexer with a weight of 2,160 g and a residence time of six minutes. Higher melt flow rates for the blends as compared to the PET control indicate a lower melt viscosity at the given temperature when heated:

| Composition | Temp(°C.) | Melt flow rate (g/10 min) |
|---|---|---|
| PET (control) | 285 | 10 |
| PET/LCP* (90/10) | 270 | 54 |
| PET/LCP* (95/5) | 270 | 55 |
| PET/LCO** (90/10) | 270 | 52 |
| PET/LCO** (95/5) | 270 | 30 |

*"LCP" indicates the type of block copolymer of a triad aromatic mesogen (with $C_4$ alkylene spacer) and polybutylene terephthalate described in U.S. Pat. application No. 726,601, filed July 8, 1991. The data for these blends is presented for comparison purposes only.
**"LCO" indicates the oligomer from Example 5.

EXAMPLES 12–13

These Examples show two blends of the oligomers (LCO) of this invention with the spinning and draw ratio (DR) conditions. Initial modulus (IM), breaking tenacity (BT) and elongation at break (EAB) data of monofilaments is presented:

| | Blends (PET/LCO, wt/wt) | |
|---|---|---|
| Temperature (°C.) | 90/10 | 95/5 |
| Zone 1 | 240 | 284 |
| Zone 2 | 274 | 296 |
| Zone 3 | 290 | 296 |
| Die | 243 | 286 |
| Output (g/min) | 0.77 | 0.66 |
| Total DR | 7.26 | 7.44 |
| IM (N/tex) | 14.1 | 13.9 |
| BT (mN/tex) | 680 | 780 |
| EAB (%) | 7.2 | 9.1 |

These Examples merely illustrate certain embodiments of the present invention and, for that reason, should not be construed in a limiting fashion. The scope of protection sought is set forth in the claims which follow.

We claim:

1. A single phase blend of: (a) a flexible coil polymer substrate; and (b) a thermotropic, essentially liquid crystalline oligomer, which is essentially mesogenic in character and wherein the oligomer consists essentially of the repeat unit —((CH$_2$)$_n$OC(O)ArOC(O)ArC(O)OArC(O)O)— where n ranges from 2 to 10 and each Ar is para-phenylene.

2. A blend as claimed in claim 1 wherein the oligomer has a weight average molecular weight of no more than about 6,000.

3. A blend as claimed in claim 1 wherein n is 4.